Jan. 23, 1962 — P. GREGER — 3,017,814
PHOTOGRAPHIC CAMERA
Filed Nov. 12, 1958 — 10 Sheets-Sheet 1

INVENTOR
PAUL GREGER
BY
Mocker Blum
ATTORNEYS

Jan. 23, 1962 P. GREGER 3,017,814
PHOTOGRAPHIC CAMERA
Filed Nov. 12, 1958 10 Sheets-Sheet 2
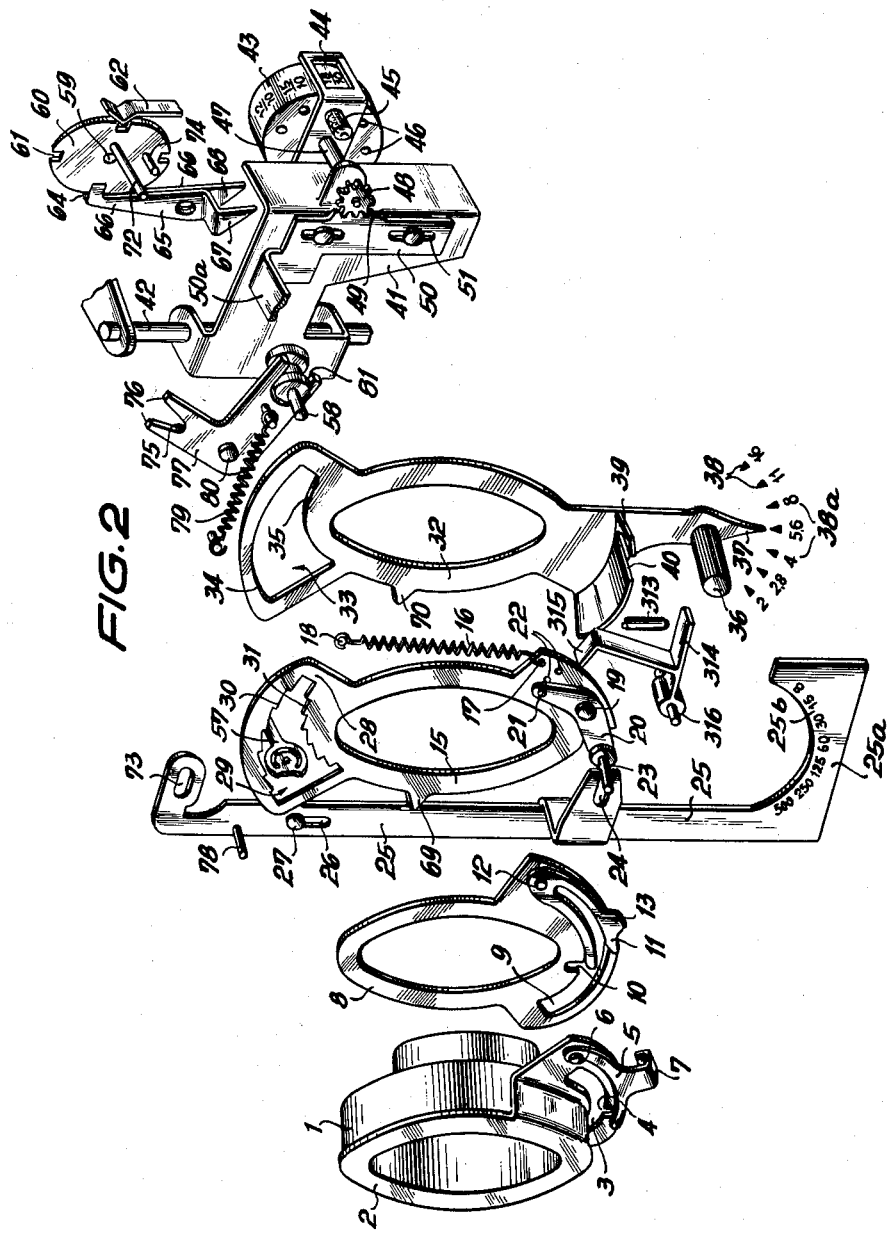
INVENTOR
PAUL GREGER
BY
Mocker Beun
ATTORNEYS

INVENTOR
PAUL GREGER

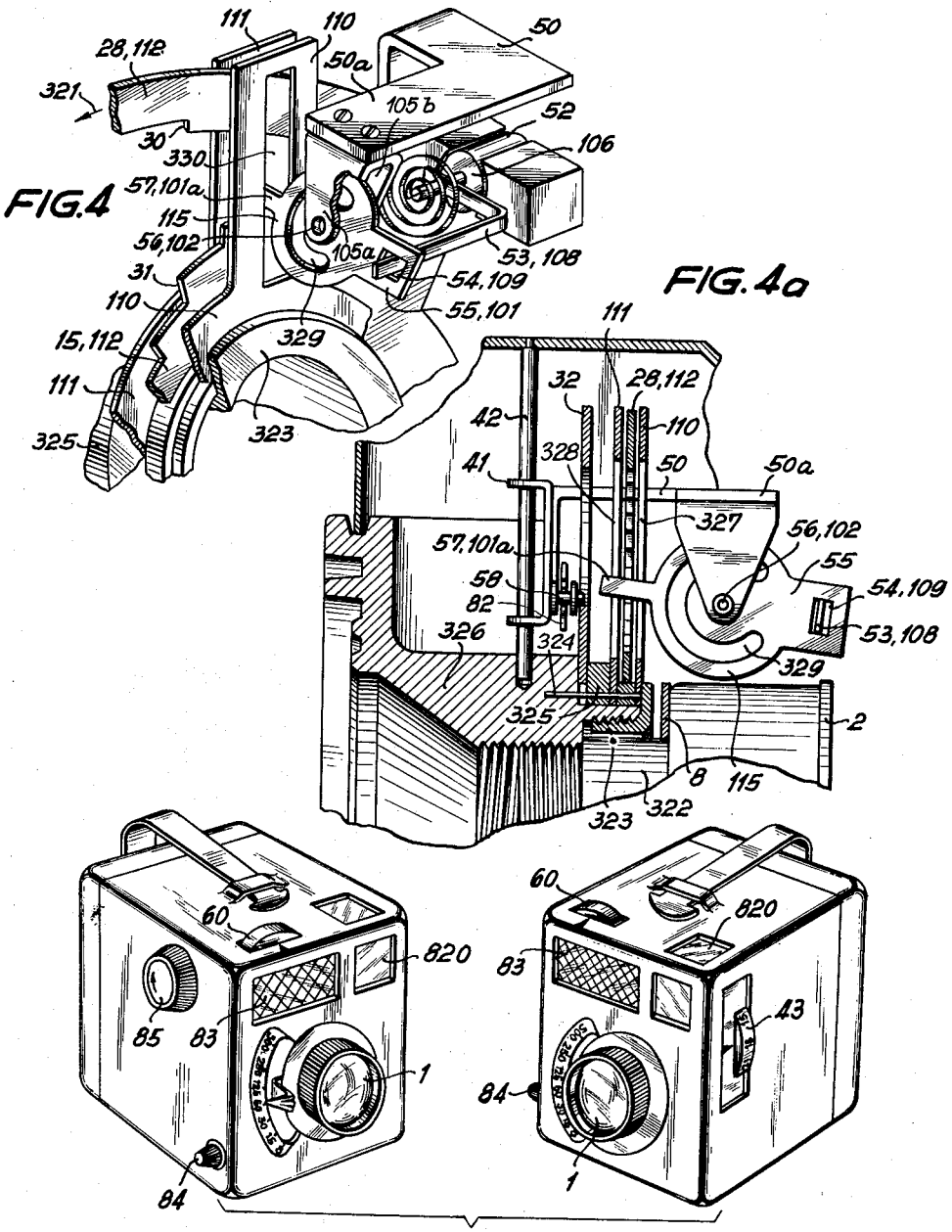

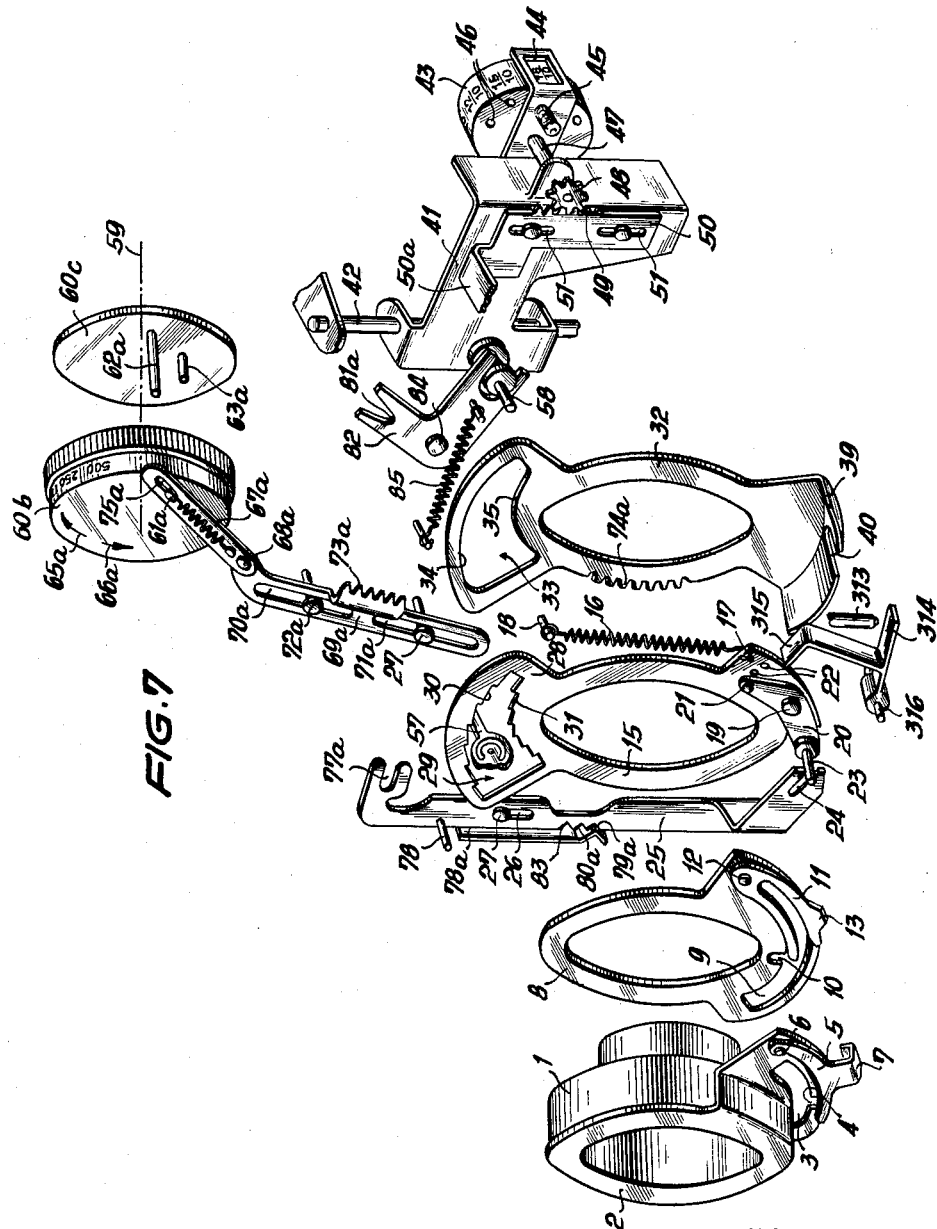

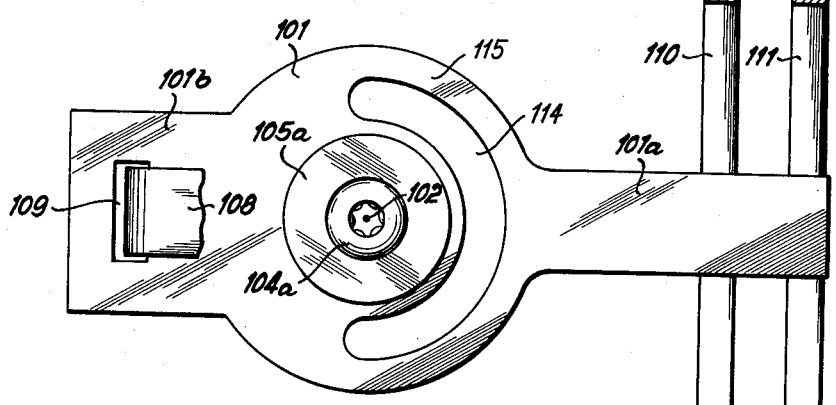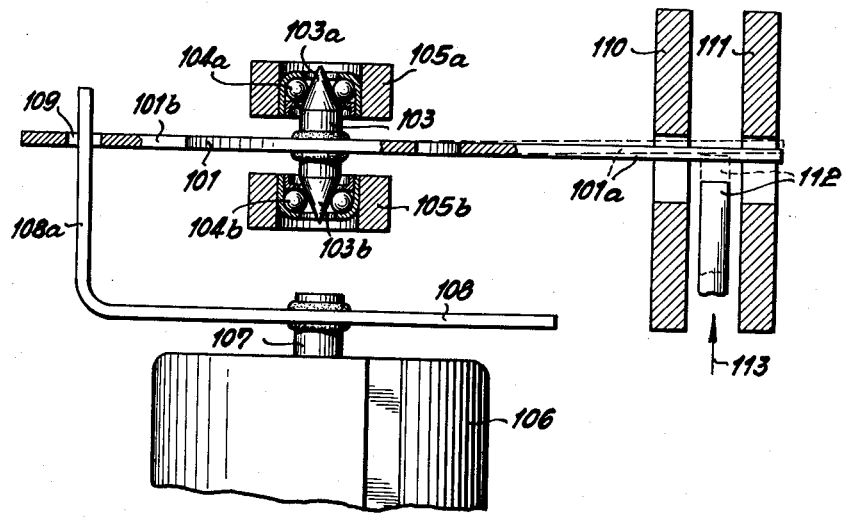

Jan. 23, 1962  P. GREGER  3,017,814
PHOTOGRAPHIC CAMERA
Filed Nov. 12, 1958  10 Sheets-Sheet 8

INVENTOR
PAUL GREGER

BY
Mock+Blum
ATTORNEYS

Jan. 23, 1962 P. GREGER 3,017,814
PHOTOGRAPHIC CAMERA
Filed Nov. 12, 1958 10 Sheets-Sheet 9

*INVENTOR*
PAUL GREGER

BY
*Mock & Blum*
ATTORNEYS

Jan. 23, 1962   P. GREGER   3,017,814
PHOTOGRAPHIC CAMERA
Filed Nov. 12, 1958   10 Sheets-Sheet 10

INVENTOR
PAUL GREGER

BY
Mocker Blum
ATTORNEYS

United States Patent Office

3,017,814
Patented Jan. 23, 1962

3,017,814
PHOTOGRAPHIC CAMERA
Paul Greger, Braunschweig, Germany, assignor to Voigtlander A.G., a corporation of Germany
Filed Nov. 12, 1958, Ser. No. 773,504
18 Claims. (Cl. 95—10)

This invention relates to photographic cameras of the type provided with means for coupling the respective adjusting elements for the diaphragm, shutter time and film sensitivity, and in which the setting is automatically adjustable in dependence on the light value measured by an electric exposure meter, after preliminary selection of one of the two factors influencing the setting, i.e., of the diaphragm value and the shutter time.

In order to extensively eliminate wrong exposures in taking photographic pictures, there has been a tendency, in the construction of cameras, to provide for intercoupling the adjusting steps necessary for obtaining correct exposure. Many suggestions have been made in this direction, and the present general use of shutters provided with light value numbers is one of the results of these suggestions. In addition, it has also been suggested to intercouple, not only the diaphragm and the shutter time, but also other exposure factors, such as the film sensitivity and filter factors.

Furthermore, it has been suggested to provide photographic cameras with devices which render it possible, at a preselected adjustment of one factor, such as the diaphragm opening or the shutter time, to automatically adjust the coordinated correct value of the other exposure factor, i.e., the shutter time or the diaphragm opening, in dependence on the pointer deflection of an electrical exposure meter. The kind of preselected value, i.e., the factor which can be freely selected, is fixed once for all in the manufacture of these cameras. They can be constructed either in such a manner that the diaphragm value is selected by hand and the shutter time is adjusted automatically, or vice versa in such a manner that, at preselected shutter time, adjustment of the diaphragm takes place automatically. However, in these cameras the respective factor which can be manually pre-adjusted and the respective factor which is automatically adjusted are pre-set during the building of the camera, and it is not possible for the camera user to select which one of two exposure factors he desires for manual adjustment, leaving the other exposure factor to be automatically adjusted. Furthermore, in these cameras, only one exposure factor can be manually adjusted, with the other exposure factor being automatically adjusted, so that it is not possible to adjust both exposure factors, such as the diaphragm opening and shutter time, for example, manually.

Cameras of this type in which, in the design and construction of the camera, one of two exposure condition setting means is made manually adjustable and the other exposure condition setting means is made automatically adjustable in accordance with the setting of the manually adjustable means and the indication of the exposure meter, provide generally satisfactory operation under most picture taking conditions. However, the fixed design of such cameras introduces limitations into picture taking under certain conditions. Thus, in a camera of this type in which the shutter time is made manually adjustable and the diaphragm opening is automatically adjusted in accordance with the shutter time setting and the indication of the exposure condition, it may, at times, be desirable to have the diaphragm opening manually adjustable with the shutter time being automatically set in accordance with the diaphragm opening and the indication of the exposure meter. Also, there may be other instances where, for best results in the taking of pictures, it may be desirable to have both the shutter time and the diaphragm opening manually adjustable. It will be appreciated that it is not possible to accommodate to these conditions a camera in which the particular value which is manually adjustable and the particular value which is automatically adjustable are pre-set in the construction of the camera.

To this end, the present invention is directed to an improved camera construction wherein either one of two exposure condition setting means, such as the shutter time or the diaphragm opening, may be selectively made manually adjustable with the other exposure condition setting means being made automatically adjustable depending upon the initial manual setting of the first exposure means and the indication of an exposure meter. Further, the construction includes means whereby the user of the camera may selectively uncouple the two exposure condition setting means so that both of these may be adjusted manually.

More particularly, the camera of the present invention is provided with a shutter time adjusting ring and a diaphragm adjusting ring rotatably mounted on and coaxial with the camera objective. Immediately behind these two rings are a pair of generally annular members. One of these annular members is provided with a generally arcuately extending recess having stepped surfaces along its opposite arcuately curved surfaces, this recess tapering in radial depth from one end to the other. For ready reference, this particular annular member will be referred to as the "stepped disk." Axially adjacent this first annular member is the second annular member which also has a generally arcuately extending recess which tapers in radial depth from one end to the other but whose longer and curved sides are smooth. For ready reference, this latter annular member will be referred to as the "cam disk."

A novel coupling arrangement is provided whereby, during automatic operation, the cam disk is always coupled to the manually adjustable ring, which may be either the shutter time setting ring or the diaphragm setting ring. On the other hand, the stepped disk is, during automatic adjustment, always coupled to the diaphragm ring or the shutter time ring which is arranged to be automatically set in dependence upon the position of the manually adjusted ring and the reading of the exposure meter. For this purpose, the arcuate slot in the cam ring cooperates with means for adjusting the relative position of the exposure meter measuring system in the camera casing, and the indicator of the exposure meter measuring system extends into the arcuate slot of the stepped disk. By virtue of the rotation of the cam disk, the exposure meter measuring system is thus adjusted so that its indicator will occupy different positions radially of the arcuate slot of the stepped disk and thus, in any particular instance, will engage a different stepped surface thereof depending upon the initial adjustment of the measuring system as well as the value of the indication. The stepped disk is spring biased to rotate in such a direction as to successively scan the indicator of the exposure meter with the stepped surfaces of its arcuate slot. When so rotated, it adjusts the automatically adjustable ring.

The cam disk is provided with a pointer which cooperates with a pair of scales, one relating to the shutter time and the other relating to the diaphragm opening. The means for pre-selecting which one of the two setting rings, shutter time or diaphragm, is to be manually adjusted also acts to uncover one or the other of these scales so that the appropriate scale is available for manual adjustment of the cam disk which is effected by a projecting handle.

As a further feature of the invention, the film sensitivity is taken into account by virtue of setting means which, when the back of the camera is open to place a new film therein, may be set in accordance with the sensitivity of such new film. The adjustment of this setting means presets the position of the exposure meter measuring system so that its initial position with respect to the stepped surfaces of the stepped disk and with respect to the cam surfaces of the cam disk is pre-set in accordance with such film sensitivity. Provision is further made for bracing the indicator of the exposure meter against any shock due to engagement with the stepped surfaces of the stepped disk so that this indicator will not be bent out of position no matter how fragile its construction. To this end, the indicator of the exposure meter is made relatively stiff in its direction of movement in giving an indication, and relatively flexible in a direction at right angles to its plane of oscillation or rotation. The stepped surfaces are so arranged that they tend to bend the indicator in this latter direction, and bracing is effective to limit the amount of deflection of the indicator when engaged by a stepped surface.

For an understanding of the principles of the invention, reference is made to the following description of typical embodiments thereof as illustrated in the accompanying drawings. In the drawings:

FIG. 2 is an exploded perspective view of the principal parts of the mechanism shown in FIG. 1;

Figure 1:
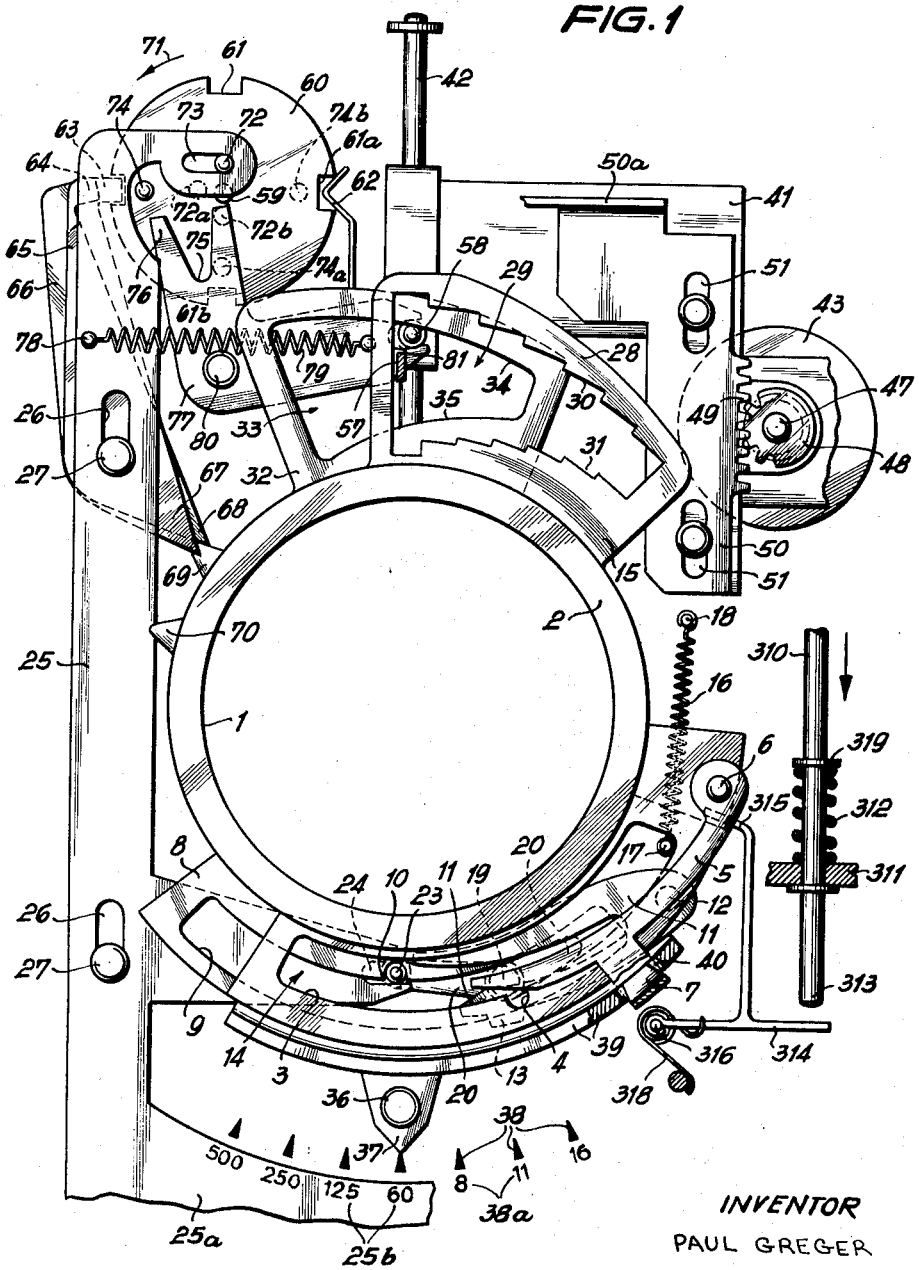
FIG. 1 is a front elevational view of one form of adjusting mechanism embodying the present invention, the photoelectric measuring and controlling structure being omitted.
Figure 3A:
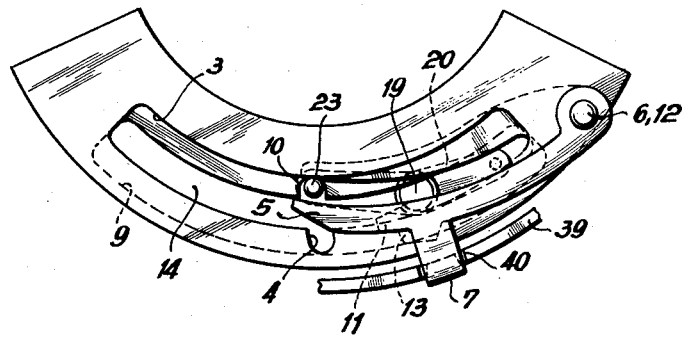
Figure 3B:
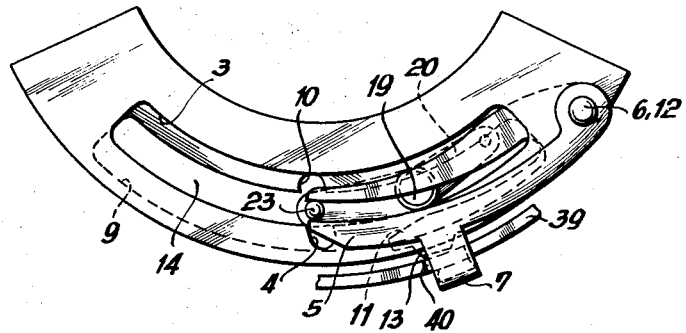
Figure 3C:
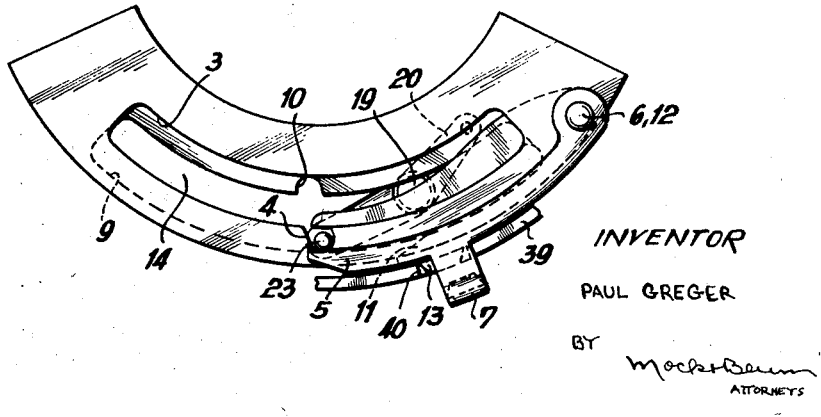
Figure 6:
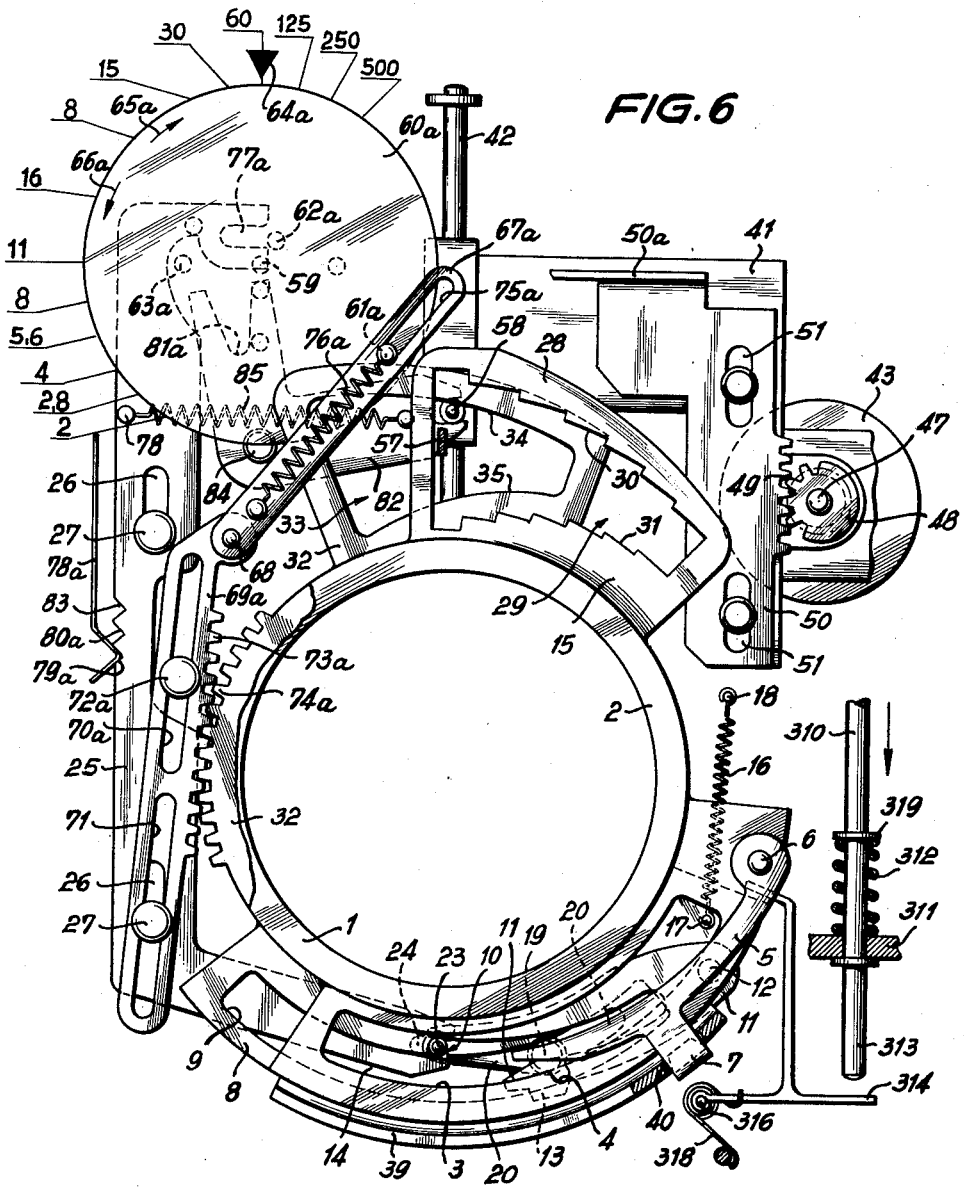
Figure 10:
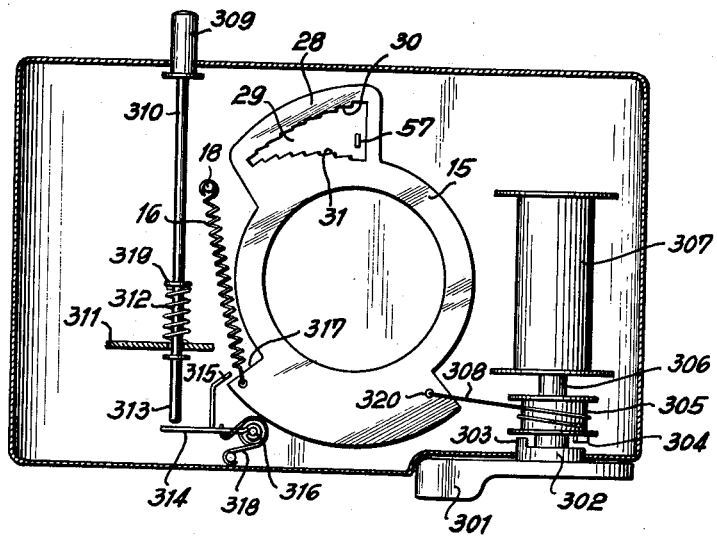
Figure 10A:
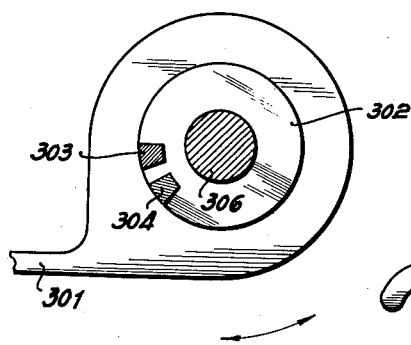
Figure 10B:
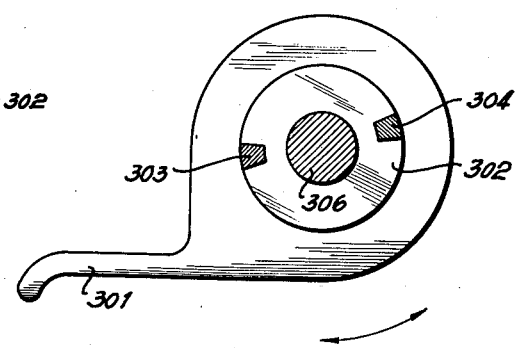
Figure 11:
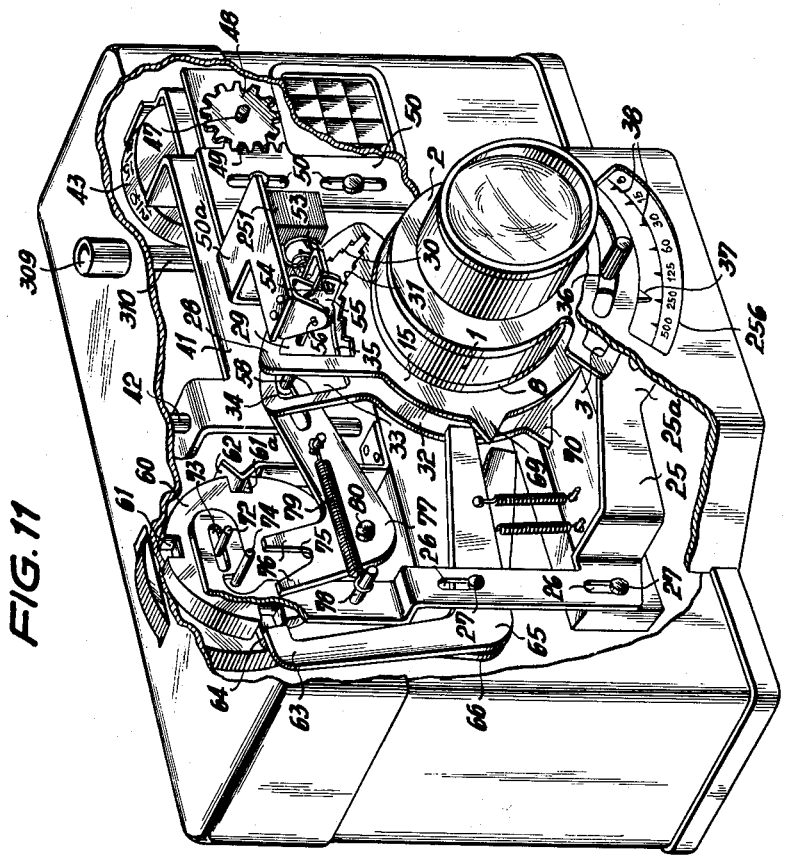
Figure 12:
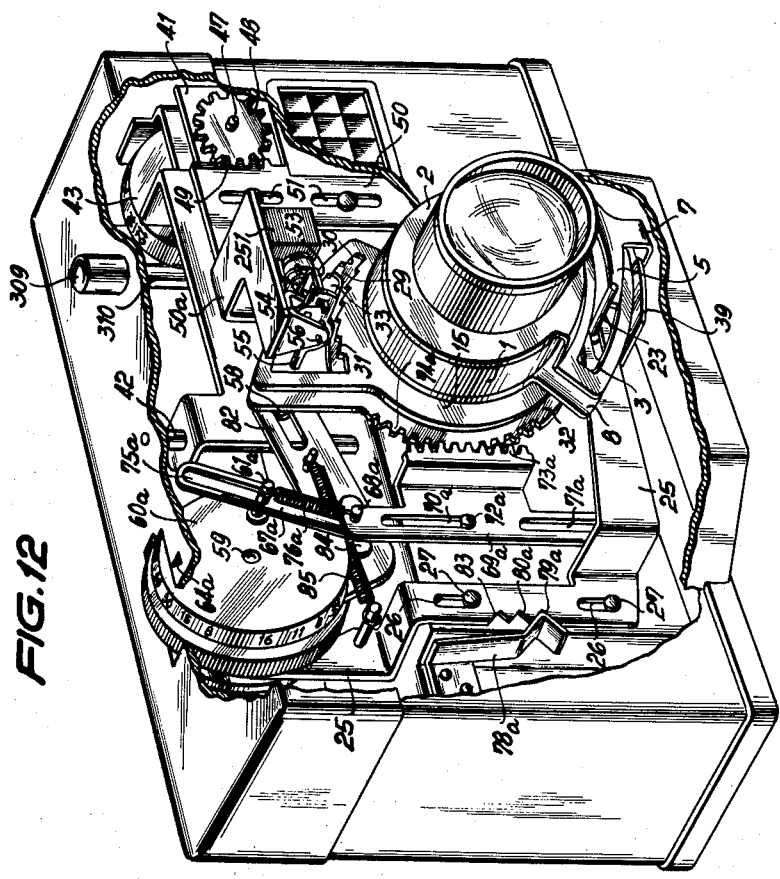

FIGS. 3a, 3b, and 3c are partial elevational views illustrating three different positions of the means for selectively coupling the setting rings and the two disks;

FIG. 4 is a partial perspective view illustrating the measuring system of the exposure meter, the cooperation of its indicator with the stepped disk, and the bracing means for the indicator;

FIG. 4a is a vertical sectional view through a camera further illustrating certain features shown in FIG. 4;

FIG. 5 is a dual perspective view of a box-type camera embodying the form of the invention more specifically illustrated in FIGS. 1 and 2;

FIG. 6 is a view similar to FIG. 1 illustrating an alternative embodiment of the invention;

FIG. 7 is an exploded perspective view of the principal parts of the adjusting mechanism shown in FIG. 6;

FIG. 8 is an elevational view illustrating a modified form of the means for transmitting the position of the exposure meter indicator to the stepped disk, and including the bracing means;

FIG. 9 is a sectional view taken at substantially right angles to FIG. 8;

FIG. 10 is a somewhat diagrammatic vertical sectional view illustrating release of the stepped disk shortly before the exposure takes place, and further illustrating means for advancing the film;

FIGS. 10a and 10b are partial views taken at right angles to the plane of FIG. 10 and illustrating two different positions of the film winding means;

FIG. 11 is a partly broken away perspective view of a miniature camera embodying the adjusting mechanism shown more particularly in FIGS. 1 and 2; and FIG. 12 is a view similar to FIG. 1 but illustrating the mechanism shown more particularly in FIGS. 6 and 7.

In the drawings, FIGS. 1, 2, 5, and 11 illustrate one embodiment of the invention, and FIGS. 6, 7 and 12 illustrate another embodiment thereof. The other figures of the drawings illustrate details which may be used with either one or both of these embodiments.

Referring first to the embodiment of the invention shown in FIGS. 1, 2, 5, and 11, and with further reference to the other figures of the drawings except FIGS. 6, 7, and 12, the shutter case 1 has a shutter time adjusting ring 2 rotatably mounted thereon. Ring 2 has a radial extension formed with an arcuate slot 3, the radial outer edge of which is formed with a substantially radial notch 4. A lever 5 is pivoted at one end to the extension of ring 2, as by rivet 6, and has its free end spring biased toward the shutter casing. This lever 5, which may cover the notch 4, has a rearwardly extending claw 7.

A diaphragm adjusting ring 8 is also rotatably mounted on the shutter casing 1 behind the shutter time adjusting ring 2. Ring 8 also has a radial extension formed with an arcuate slot 9 in the inner edge of which is a substantial radially extending notch 10. A lever 11 is pivoted to the extension of ring 8, as by a rivet 12, and has a radially outwardly projecting finger 13. Lever 11 is spring biased away from the shutter casing.

The two recesses 3 and 9 are arranged concentrically around the center of the shutter, but they are radially staggered relative to each other to a certain extent so that a zone remains open as a slot 14, which latter has the same length as recesses 3 and 9, when the adjusting rings 2 and 8 are turned to their limiting positions.

Behind the diaphragm-adjusting ring 8, an annular member 15, hereinafter referred to as the "stepped disk," is rotatably mounted on the objective. Disc 15 is constantly biased counterclockwise by a draw spring 16, one end of which is fastened at 17 to stepped disc 15, while its other end is fastened by means of pin 18 to the camera casing (not shown). When stepped disc 15 is free to rotate under the bias of spring 16, its maximum limit of rotation is determined by a suitable stop which has not been shown in FIGS. 1 and 2. Pivoted about rivet 19 provided on the stepped disc 15 is a control lever 20, one end 21 of which can resiliently and releasably engage depressions 22 of stepped disc 15, while the other end of the lever carries a pin 23 which projects into slot 14 formed by recesses 3 and 9 in the time-adjusting ring 2 and diaphragm-adjusting ring 8, respectively. Furthermore, pin 23 engages a notch 24 of slide 25, which is arranged beside the stepped disc 15. Slide 25 is guided for longitudinal movement by means of slot 26 and bolt 27, which latter may be fixedly connected, for example, to the camera wall. On its lower end, slide 25 is formed as a flag 25a whose upper edge is in the shape of a circular arc. A scale 25b is applied to the flag 25a along the circular arc.

The disc 15 is denoted "stepped disc" in view of a recess 29 provided in its upper extension 28. In the example shown in the drawings, this recess 29 has about the shape of an acute-angled isosceles triangle which is deformed in such a manner that the bisector of its vertex angle is an arc concentric with the disc. The two longer sides 30 and 31 are provided with steps facing in opposite directions.

Projecting into recess 29 is a pointer part 57, which extends into the recess from the left, in front, to the right, in the rear, in the perspective used in FIG. 2. In order to retain stepped disc 15 in rest position against the bias of spring 16, angle lever 314 is used, and this angle lever is operated by end portion 313 of the release key 310, in the manner described hereinafter, e.g. in connection with FIG. 1.

FIG. 2 illustrates a condition in which the stepped disc 15 has already been released by operation of the release key of the camera and could, therefore, follow the pull of spring 16 until a step in step series 31 abuts against pointer member 57. Thus, the condition shown in FIG. 2 illustrates a measuring position, in which a picture is taken with correct exposure value.

Immediately behind stepped disk 15, an annular member 32, hereinafter called the "cam disk" is oscillatably mounted on the objective. This cam disk has a radial extension containing a recess 33 which has a shape similar to that of the recess 29 with the only difference that the curved edges 34 and 35 are not stepped, but run in continuous lines. The cam disc 32 carries a handle member 36, provided with a pointer 37 which is manually displaceable along the scale marks 38. Below the scale marks 38, a scale of numbers 38a is provided. Above the handle member 36 the cam disc 32 is bent at a right angle. The circular bent flap 39 thus formed is provided with a recess 40, which has the same width as that of the nose 13 provided on the lever 11 and that of the claw 7 on lever 5.

Behind the cam disc 32 is a slide or runner 41 which can be displaced along the fixed shaft 42. The device for adjustment of the film sensitivity is arranged on the runner 41. This device comprises a scale-carrying drum 43, to which the DIN-values of the film sensitivity are applied, and which is enclosed to such an extent that only the DIN-value adjusted in each case can be read in a window 44. The drum 43 is retained in adjusted position by means of a spring biased pin 45 engageable in depressions 46, and it can be adjusted only when the back wall of the camera is open.

The shaft 47 of drum 43 has a pinion 48 secured thereto and engaging rack teeth 49 of a slide 50. Slide 50 has spaced longitudinal slots 51 which receive headed members on the runner 41 so that slide 50 is guided for movement substantially parallel to the shaft 42. Displacement of slide 50 relative to runner 41 takes place in accordance with the film sensitivity as adjusted by the drum 43. Each adjusting step of the drum 43, as determined by the notches 46, corresponds to the length of one stepped surface 30 or 31 of the recess 29 in the stepped disk 15, and to a distance along sides 34, 35 of recess 33 corresponding to a displacement of the pointer 37 of cam disk 32 from one scale mark 38 to the next adjacent one. Slide 50 is formed to extend past the cam disk 32 and the stepped disk 15 and to about the middle of shutter 1.

Slide 50 is formed with an arm 50a which projects from the plane of the drawing in FIG. 1 and carries the exposure meter measuring instrument 251 (FIG. 11) so that pointer part 57 projects into the recess 29, as shown in FIG. 1.

Adjacent the lower right hand corner of FIG. 1, there is illustrated a generally T-shaped lever 314 which is pivoted at 316 and biased by a spring 318 to rotate in a counterclockwise direction. Lever 314 has a bent end 315 which is normally disposed beyond the end (shown in dotted lines) of the arcuate extension of stepped disk 15 carrying the lever 20. Lever 314 thus retains the stepped disk against rotating counterclockwise under the influence of spring 16. When release key 310 is depressed, lever 314 is pivoted to disengage its bent end 315 from the stepped disk 15 so that the latter may be rotated counterclockwise by the spring 16. This counterclockwise rotation will continue until one of the steps 30 or 31 of the recess 29 engages the pointer member 57 to arrest further motion of the stepped disk 15.

This arresting operation will be understood best by reference to FIGS. 4 and 4a. As best seen in these FIGURES, on either side of the stepped disk 15, two supporting discs 110 and 111 are arranged around the mount 322 of the picture-taking objective. These disks are held stationary on structural parts 325 and 326, fixed in the camera, by means of a screw ring 323 and a locking pin 324. Supporting discs 110 and 111 are formed with extensions, which have aligned slots 327 and 328 defining the path of motion of pointer part 57. Only one of these recesses is visible in FIG. 4, that formed in supporting disk 110. As illustrated, pointer 55 is formed with an arcuate recess 329 extending through at least 180 degrees, so that, in arresting the motion of stepped disk 15, it has the effect of a soft spring. This relieves any shock on its pivot 56 as well as any shock on the pointer 53 of the measuring instrument, which pointer, while used to effect movement of pointer 55, is designed very delicately and sensitively. In order to keep bending of pointer 55 in narrow limtis, it is mounted in such manner that its pointer portion 57 engages the slot surfaces 330 of supporting discs 110 and 111 at minimum deflections.

In FIG. 4 a condition is illustrated which occurs after the release key 309 (see FIG. 11) has been actuated, the stepped disc 15 has been moved counterclockwise biased by spring 16, until the step of row 31, which corresponds to the measuring position of pointer 55, abuts against pointer part 57 and causes adjustment of either the time or the diaphragm adjusting means in accordance with the correct exposure value.

The measuring mechanism 251 is a moving coil type of instrument including a coil 52 to which is secured a pointer 53. This pointer, which is in the form of a feeler, extends through an aperture 54 of the pointer member 55 which is essentially a balanced lever pivoted, at substantially its center of gravity, on a relatively sturdy shaft 56. As stated, the pointer part 57 of the lever 55 projects into the recess 29 of stepped disk 15 for cooperation with the steps 30 and 31 along the side surfaces thereof. Whether pointer part 57 engages the upper row of steps 30 or the lower row of steps 31 is dependent upon the position of the runner 41 movable along the shaft 42. The vertical portion of slide 41 carries a pin 58 for a purpose to be described.

An arresting disk 60 is rotatably mounted on a shaft 59 fixed in the camera casing, and can be adjusted by means of a handle member (not shown in the drawings) from its position shown in the drawings by 180° counterclockwise, and can then be returned inversely to its initial position. On the periphery of disc 60 there are four notches 61 that are a distance of 90° from each other. These notches can be engaged by spring 62, serving to secure the position of the disc, as well as by the noses 63 and 64, respectively, of two locking levers 65 and 66. The locking levers 65, 66 are mounted one behind another on the camera casing and are movable about the same pivot. The off-set locking lever 65, 67 (FIG. 2) is coordinated with stepped disc 15, while locking lever 66, 68, which is arranged behind it and is shown as having a straight shape, is coordinated with cam disc 32. The object of the locking levers is to prevent movement of disc 60 unles stepped disc 15 and cam disc 32 are in predetermined limit positions. Stepped disk 15 and cam disk 32 are formed with radially projecting noses 69 and 70, respectively, which engage lever ends 67 and 68, respectively, only when the stepped disk 15 and the cam disk 32 are in such limiting positions. When noses 69 and 70 engage the levers 65 and 66, respectively, they rock these levers to disengage the noses 63 and 64 thereof from their respective locking notches of disk 70 so that the latter can then be turned to effect switching of the adjustment mechanism.

When the stepped disk 15 and the cam disk 32 are in the position wherein disk 60 is released by oscillation of the levers 65 and 66, notch 4 of the shutter time adjusting ring 2 and the notch 10 of the diaphragm adjusting ring 8 will be radially aligned with the pin 23 on control lever 20. Also, notch 40, in arcuate flap 39 of cam lever 32 will be aligned with claw 7 of lever 5 on time adjusting ring 2 and with nose 13 of lever 11 on shutter adjusting ring 8. Under these conditions, the switching of the adjustment mechanism can take place. If, in effecting this switching, disc 60 is turned in the direction of arrow 71 to such an extent that spring 62 disengages recess 61a and engages recess 61b, pin 72, which is eccentrically mounted on disc 60, will be moved to a position 72a. Pin 72 is engaged in a horizontally extending slot 73 in an angular extension of slide 25. Thus, under these conditions slide 25 will be moved downwardly so that pin 23, which is engaged in a notch 24 of the slide, will be moved into the open slot 14 of the recesses 3 and 9 on the time adjusting ring and the diaphragm adjusting ring, respectively. Thus, the shutter time and the diaphragm opening can be freely selected and adjusted manually.

Also, under these conditions, the automatic adjusting mechanism under the control of the exposure meter is rendered inoperative. This is due to the fact that time adjusting ring 2 and diaphragm adjusting ring 8 are now both uncoupled from either the stepped disk 15 or the cam disk 32. Furthermore, a pin 74 fixed to disk 60 is moved to a position 74a wherein it is engaged with a notch 75 of the fork 76 of a lever 77 pivotally mounted at 80. Lever 77 is thus retained in an intermediate position in which a tension spring 79, connected to slide 25 at 78 and having its opposite ends connected to lever 77, extends above pivot 80, under tension. Lever 77 has a second fork end which receives the pin 58 on the slide 41, and in the intermediate position of lever 77, slide 41 is moved to a position wherein the pointer part 57 is maintained out of the range of possible engagement with either of the stepped surfaces 30 or 31.

The position of pin 23 when disk 60 is in the orientation shown in FIG. 1 is illustrated in FIG. 3a. In the "neutral" position just described, the pin 23 occupies the position shown in FIG. 3b.

If disk 60 is now turned an additional 90 degrees in the direction of arrow 71, pin 72 will move from position 72a to position 72b. Slide 25 is moved further downwardly so that, through the medium of slot or fork 24, pin 23 of lever 20 is moved into notch 4 of the shutter time adjusting ring 2. During this movement, pin 23, through lever 11, moves nose 13 into engagement with notch 40 in the arcuate flap 39 of the cam disk 32, and, through locking of lever 5, the claw 7 has been moved further away from engagement in this notch 40. At the same time, pin 74 has moved from position 74a to position 74b. During this movement, pin 74 has rocked lever 77 to a position wherein the tension spring 79 is disposed below the pivot 80, and lever 77, through pin 58, has moved slide 41 downwardly to bring pointer part 57 within effective cooperating range of the lower stepped surfaces 31 of recess 29. The lever 77 is retained in this position by the toggle action of the spring 79. The position of pin 23 is now as shown in FIG. 3c. Thus, in this last described position of disk 60, the diaphragm can be adjusted by hand, while adjustment of the shutter is effected by the automatic system controlled by the exposure meter, in conformity with the measured light value.

FIG. 5 illustrates, by way of example, the appearance of a box-type photographic camera embodying the invention adjusting mechanism as shown in FIGS. 1 and 2 more particularly. At either limit of adjustment of disk 60, one of the rings 2 or 8 can be manually adjusted whereas the other ring has its adjustment controlled by the automatic mechanism responsive to the light value measured by the photoelectric cell 83. In the intermediate position of disk 60, both the shutter time setting ring 2 and the diaphragm opening setting ring 8 may be adjusted manually. The film sensitivity adjusting drum or knob 43 is set at the insertion of a film in accordance with the sensitivity of the particular film, and this adjustment can be effected only if the back wall of the camera is opened. When the operator is looking at the scene to be photographed through the finder 82o, the photoelectric cell 83 is brought into the position where it measures the amount of light available at the scene to be photographed and thus produces the measuring current determining the automatic adjustment of one exposure condition controlling member. Release of the shutter to make a photograph with the correct light value is effected by means of button 84, and the film is advanced by rotating button 85.

Referring now more particularly to that embodiment of the invention illustrated specifically in FIGS. 6, 7, and 12, the shutter time adjusting ring 2 and the diaphragm opening adjusting ring 8 have the same construction as in the embodiment of FIGS. 1, 2, 5, and 11, and are mounted in the same manner as therein described. While the stepped disk 15 and the cam disk 35, as well as the slide 25, occupy the same relative relation as in the embodiment of FIGS. 1, 2, 5 and 11, the cam disk 32 and the slide 25 are slightly modified as compared to the already described embodiment. However, the stepped disk 15 corresponds identically to the stepped disk 15 shown in FIGS. 1 and 2.

The film sensitivity adjusting drum 43, the slide 50, the slide 41, the lever 82, corresponding to the lever 77 of FIGS. 1 and 2, and the spring 85, corresponding to the spring 79 of FIGS. 1 and 2, are identical with the corresponding parts of FIGS. 1 and 2 and cooperate in the same manner.

A mechanism switching drum 60a, corresponding to the drum 60 of FIGS. 1 and 2 is rotatably mounted on a shaft 59 fixed in the camera, and is provided with pins 61a, 62a and 63a (see FIG. 6). This disc 60 is divided, as seen in FIG. 7, into a drum 60b and an annular disc 60c. The pins 62a and 63a are fixedly seated on the disc 60c. The pin 61a is carried by drum 60b, on the peripheral surface of which the scales for the time and diaphragm values are also indicated. Drum 60b and disc 60c are connected with each other in such a manner that they are always rotated together. Pins 62a and 63a correspond to the pins 72 and 74, respectively of FIGS. 1 and 2, and function in the same manner as these latter pins.

The disc 60a (see FIG. 6) can be turned clockwise until the time adjustment of ⅛ second is located below the stationary mark 64a. In counterclockwise direction its turning range extends up to the diaphragm value 16. Both limitations of rotation are indicated by arrows 65a and 66a. Within this rotation range of about 330°, the disc 60 and pins 61a, 62a, and 63a fixed thereto effect not only adjustments as to the shutter time and the diaphragm aperture values but also effect switching of the adjusting means to effect selective intercoupling of the ring 2 and the ring 8, on the one hand, with the disk 15 or the disk 32, on the other hand, or to free ring 2 and ring 8 for independent manual adjustment without automatic control.

The manner in which this is effected will be clear from the following explanation. If it is assumed, as a starting point, that the time value of ⅛ of a second is located opposite the indicating mark 64a, pin 61a then occupies its lowest or deepest position. This pin is engaged in an elongated slot 75a adjacent the outer end of a link 67a, and is biased toward the inner end of this slot by a spring 76a connected to link 67a and to pin 61a. The inner end of link 67a is pivotally connected, at 68, to a rack 69a having longitudinally spaced elongated guiding slots 70a and 71 in which are engaged pins 72a and a pin 27 which corresponds to the pin 27 of FIGS. 1 and 2. The teeth 73a of the rack 69a are in mesh with the teeth 74a of a rack extending through an arc of the circumference of the cam disk 32. In the position of the parts shown in FIG. 6, cam disk 32 is coupled to shutter time adjusting ring 2 by virtue of claw 7 being engaged in slot 40 of flap 39 of the cam disk.

As pin 61a reaches its lowest point, the cam disk 32 and thus the time adjusting ring 2 are brought to the aforementioned limiting position. If disk 60 is now rotated counterclockwise through about 90 degrees, it will, through pin 61a, link 67a, and rack 69a, adjust ring 2 through all the available shutter time values in sequence until the smallest time value is reached, wherein the designation 1/500 of a second is opposite the mark 64a. At any selected time value within the available range, the automatic exposure adjusting mechanism, acting through the stepped disk now coupled to the diaphragm setting ring 8, can provide the proper diaphragm value for the measured light value, as by operating the release button on the camera.

If disk 60 is turned through an additional angle of about 90 degrees, in a counterclockwise direction, the pin 61a will be aligned with the indicating mark 64a. Although ring 2 and cam disk 32 will have reached their limit of adjustment in the opposite direction, movement of pin 61a to this latter position is still possible due to the fact that it is engaged in the slot 75a of the link 67a and can move outwardly along this slot, the link 67a now being substantially higher than as illustrated in FIG. 6. As pin 61a travels toward the mark 64a, pin 62a enters slot 77a of slide 25 and moves this slide downwardly to an extent such that the bent end of detent spring 77a moves from notch 79a into notch 80a. In this downward movement, the slide 25 effects uncoupling of the adjusting rings 2 and 8, on the one hand, from the disks 15 and 32, on the other hand, in the same manner as described in connection with the embodiment of FIGS. 1 and 2. Also, the pin 63a will enter the fork 81a of the lever 82 and swing this lever counterclockwise to its intermediate position in which, in the same manner as described in connection with the embodiments of FIGS. 1 and 2, the arm 57 is positioned intermediate the stepping surfaces 30 and 31 and is not cooperable with either. This, as previously described, renders ineffective the automatic control by the exposure meter. The adjusting rings 2 and 8 may now be manually set as desired.

If disk 60 is turned through a further angle of about 90 degrees, the pin 62a engaged in the slot 77a will move slide 25 to its lowest position in which detent spring 78a is engaged in the notch 83. In this position, the cam disk 32 will have moved time adjusting ring 2 to a position in which its notch 4 is aligned with pin 23, so that downward movement of slide 25 will engage pin 23 in notch 4. The pin 23 will swing the lever 5 to disengage claw 7 from the notch 40 of arcuate flap 39 of the cam disk. The ring 2 is now coupled to the stepped disk 15 so that the automatic control system is now effective on the exposure time.

During this motion, pin 63a will swing lever 82 clockwise to move pin 58 downwardly toward surface 35 of recess 33 of the cam disk. This will move slide 41 downwardly so that the pointer member 57 is positioned for operative coaction with the stepped surfaces 31 of the recess 29 in the stepped disk. The diaphragm value 2 will be now positioned at adjacent the mark 64a and, by further turning disk 60 counterclockwise, the diaphragm values available through adjustment of ring 8 may be selected through movement of this ring through pin 61a, link 67a, and rack 69a. The setting of the shutter time is effected by automatic adjustment of the position of ring 2.

As already mentioned above, the handling member 60a cannot be turned counterclockwise beyond the diaphragm value 16, in the example shown.

When this value is reached, the subsequently desired adjustment and switchings are effected by turning the disc 60 in reverse direction, i.e. in clockwise direction. The control steps take place thereby in a manner analogous to that described in connection with the movement of the disc in counterclockwise direction.

FIGS. 8 and 9 illustrate a preferred construction and mounting of the lever cooperable with the steps of the stepped disks, this lever corresponding to the lever 115 having the indicating extension 57, as shown in both embodiments of the invention. The levers shown in FIGS. 8 and 9 may be used in either embodiment of the invention, as may also be its mounting arrangement.

Referring to these figures, the lever 101 has two arms 101a and 101b, and is pivotal about the axis of a shaft 103 which passes through its center of rotation 102. The shaft 103 has conical points 103a and 103b engaged in ball bearings 104a and 104b which are adjustably mounted in cylindrical members 105a and 105b, which latter are stationary in the camera. In order to obtain adjustment in the ball bearings without play, ball bearings 104a and 104b can be fixed in cylindrical members 105a and 105b. These latter, or only one of them, can be adjustable prior to fixing its final working position. Below lever 101 and its robust bearing, there is mounted the stationary measuring system 106 of the exposure meter. This system includes a measuring pointer 108 secured on rotatable shaft 107. The bent portion 108a of the measuring pointer extends through recess 109 provided in lever arm 101b.

FIG. 9 illustrates a preferred embodiment in which the shaft 107 of the electrical mechanism 106 is aligned with the shaft 103 of lever 101. However, the entire system can operate in a similarly satisfactory manner even if the two shafts 103 and 107 are not aligned with each other. If pointer 108 moves, its bent end portion 108a moves lever arm 101b and thus turns lever 101 about its center of rotation 102, whereby lever arm 101a is brought to the measuring position in each individual case.

In the range including all possible measuring positions, lever arm 101a moves freely through such range relative to two supporting ledges 110 and 111, which are arranged spaced from each other and parallel with each other, and are stationary relative to the camera. If during scanning, a scanning member 112, corresponding to the stepped surfaces 30, 31, for example, moves in the direction of arrow 113 to engage the lever arm 101a, the latter, owing to its elasticity, will engage ledges 110 and 111 after a very small deflection, so that the latter take up any further impact strain. In order to enable lever 101, and particularly its arm 101a, to yield to the impact of member 112 in a particularly soft-elastic manner, it is provided with the recess 114, which leaves only a relatively narrow strip of material 115. Due to this construction, lever arm 101a will be capable of yielding even to slight strains which act in the direction of its pivotal axis, on its point or the portion closely adjacent its point, whereby substantially no forces are transmitted to its bearing arrangement 103a, 104a, 103b, 104b. In a direction perpendicular to shaft 103, rigidity of lever arm 101a remains unchanged. In FIG. 9 the deflection of lever arm 101a, which occurs up to its contact with ledges 110, 111, is indicated in dotted lines.

If arc 115 is kept narrow and long enough, the thickness of the material of lever 101 can be correspondingly greater so that a permanent deformation due to impact by member 112 cannot occur. Recess 114 need not have the shape of a circular arc (as shown by way of example in FIG. 8) and may have any other suitable design.

If in the arrangement according to the present invention, the strains caused by impact occurring during scanning, are not completely absorbed by lever arm 101a and ledges 110 and 111, and slight residual effects are transmitted to the bearing system which, as mentioned above, has a rather robust structure and can take them up without any danger of damage. One main object of the present invention resides in preventing any injurious effect of forces on the measuring instrument 106, 107, which is naturally extremely sensitive. Additional protective steps are contemplated according to the invention which provides for a further additional protection for the measuring mechanism under very rough operating conditions. This protection is attained by designing end portion 108a and recess 109, provided in lever arm 101b, with cross-sections coordinated with each other in such a manner that they meet the following requirement: The end portion 108a of the measuring pointer should— in the direction of adjustment, i.e. perpendicularly to the longitudinal axis of lever 101—touch the peripheral surface of recess 109 at opposite points or lines; in perpendicular direction, i.e. in the direction of the axis of lever 101, considerable play should be left between portion 108a and the wall of recess 109.

FIG. 10 diagrammatically illustrates operation of the stepped disc 15, assuming a rear view of a camera according to FIG. 12, from which all parts located behind disc 15, as well as all elements which are unimportant as far as the operation of disc 15 is concerned, have been removed. FIG. 10 illustrates disc 15 in a condition set for taking the next photographic picture. The end 57 of the lever 55 has free play so that it may adjust itself to the prevailing light conditions. If the release key 309 is pressed down, against the bias of compression spring 312 arranged between a plate 311 (which is stationary in the camera) and a disc 319 fastened to release pin 310, the lower end 313 of release pin 310 will engage, prior to the shutter release, angle lever 314 which is pivoted at 316, and will move lever 314, against the bias of spring 318 downward, so that nose 315 will disengage surface 317 of stepped disc 15. At this time, discs 15 can be moved by spring 16, which is secured between point 17 on disc 15 and a pin 18 which is stationary in the camera. Thus, disc 15 will turn clockwise until one of the steps 31 (or, at another preselection, one of the steps 30) abuts the end 57 of lever 55. This movement of disc 15 is not obstructed by cable 308 fastened thereto, because cable pulley 305 is freely rotatable about shaft 306. In this manner, the (not shown) exposure element (exposure time or objective diaphragm) coupled with disc 15, has been adjusted to the measured proper exposure value. After this adjustment step, the camera shutter is released over well known, conventional means not shown in the drawings.

After taking a picture, the film feed handle 301 is moved clockwise, whereby it causes film-take-up-spool 307 fastened to shaft 306 to advance by one picture area. Simultaneously, prong 303 of clutch member 302, which latter is fixedly connected with film feed lever 301, moves cable pulley 305 by engagement with its nose 304. In this manner, disc 15 is returned, by winding of cable 308, to its initial position shown in the drawing, which position is reached when nose 315 of angle lever 314 engages under the bias of spring 318, behind surface 317 of disc 15 and arrests this disc until the next release is effected by actuation of release rod 310.

FIG. 10a illustrates film feed lever 301, with its prong 303, and nose 304 provided on cable pulley 305, when stepped disc 15 is run down. FIG. 10b shows the same elements when disc 15 is in the position shown in FIG. 10.

It will be appreciated from the above that, in rest position, or in picture taking condition of the camera, the stepped ring 15 is always in the position shown in FIGS. 1 and 6 and is held in this position by conventional means, for example a detent (not shown in FIGS. 1 and 6) which is released shortly before picture taking, for example by actuation of the shutter release button. Thus, until this moment of release, the end 57 of scale beam 55 can move freely betwen the two rows of steps 30 and 31 so that it will be permanently in a measuring position which corresponds to the light conditions in the picture taking space, at any specific time. If the taking of a picture is effected by operation of the release handle, the step coordinated with the respective measuring position will engage the end 57 of scale beam 55.

In connection with the purpose of the cam disc 32 it will be understood from the above that if handle 36 (FIG. 1) is adjusted from one value of the scale 38a or 25b, to another scale value, the cam disc 32 will move. Thereby, pin 58 will be held by spring 79, acting through lever 77, always in engagement with cam 34 (or after switching over with cam 35) of cam disc 32. Thereby, pin 58 will be more or less lifted or lowered in dependence on the manual adjustment at 36. Together with pin 58, runner 41 and slide 50, which is mounted on the latter and carries the measuring instrument and scale beam or lever 55, also move. Therefore, by adjustment of cam disc 32 the level of action of scale beam 55 is changed and this difference in the level is taken into consideration upon abutment of one of the steps of rows 30 or 31 with the end 57 of the scale beam.

The operation described in connection with FIGS. 4 and 4a, can be used in the device according to FIG. 1, as well as in that of FIG. 6.

It will be also understood that (as shown in FIGS. 2 and 7) time-adjusting ring 2 carries a swingably arranged lever 5 and diaphragm-adjusting ring 8 carries another lever 11 which is likewise swingably arranged. Thus, these two levers 5 and 11 are entirely separate structural elements. Lever 5 couples time-adjusting ring 2 with cam disc 32, while lever 11 couples diaphragm-adjusting ring 8 with cam disc 32. Of course, only one adjusting ring can be coupled at a time with cam disc 32. Therefore, in accordance with the preliminary selection either time-adjusting ring 2 or diaphragm-adjusting ring 8 is coupled with cam disc 32, as described above.

Through cam disc 32 and pin 58, the manual preselection affects the level of action of pointer member 57, which determines the degree of movement of stepped disc 15.

In using manual preselection of the diaphragm, the automatic adjusting system must act on the exposure time and, in using manual preselection of the exposure time, the automatic adjustment must act on the diaphragm. If now, for example, the manual preselection is switched from the diaphragm to the exposure time, the automatic adjusting system must be simultaneously switched from the exposure time to the diaphragm, because otherwise it would not be possible to operate the mechanism of the camera. Shifting of the manual preselection takes place over lever 20 and shifting of the automatic system over switching pin 58. Thus, lever 20 and pin 58 must be actuated simultaneously, in the manner shown in FIGS. 1, 2, 6 and 7, by means of slide 25.

The stepped disc 15 is provided with two rows of steps 30 and 31, one of which is coordinated with the automatic adjustment of the diaphragm and the other with the automatic adjustment of the exposure time. Upon shifting the manual preselection, as well as the automatic adjustment, from one of the exposure factors to the other, pin 58 will be shifted from one control cam surface (e.g. 35) of cam disc 32, to the other control cam surface (e.g. 34). This shifting of pin 58 is brought about by means of lever 77 which is under the toggle effect of spring 79. Thus, lever 77, in one position, will move pin 58 upwardly, but in the other position, lever 77 will move pin 58 downwardly. Pin 58 is connected, through intermediate members 41, 50 with the electric measuring device, so that, by shifting lever 77, in one case pointer tip 57 will act in the range of the upper row of steps 30 (which may be, for example, coordinated with the automatic diaphragm adjustment) of stepped disc 15 and in another case in the range of the lower row of steps 31 (which may be, for example, coordinated with the automatic adjustment of exposure time) of stepped disc 15.

The manually preselected value of one of the exposure factors affects over cam disc 32 the level of action of pointer 55 (57), which is controlled by the measuring current. This level of action is affected also by the value of the film sensitivity, taken into consideration in the adjustment according to the present invention. This is done by stepwise lifting or lowering the slide 50 (which carries the measuring instrument) by means of adjusting disc 43, pinion 48 and rack 49.

In addition to the above described arrangements, according to the invention, any other conventional coupling mechanism, for example, for film transport, setting of the shutter, exposure-and-film-locking means, and the like, can be used in cameras embodying the present invention. The release button can be designed in such a manner that all steps necessary for operating the camera are effected by it in proper sequence, so that after adjustment of the picture-taking distance, a fully automatic camera having only one operating handle is available.

Reference is made to my co-pending application Ser. No. 580,153 filed March 12, 1956 for "Photographic Camera," now abandoned, of which this is a continuation-in-part.

It will be understood from above that this invention is not limited to the specific structures, arrangements, steps and oher deails described above and illustrated in the drawings, and can be carried out with various modifications without departing from the scope of the invention as defined in the appended claims.

What is claimed is:

1. In a photographic camera, the combination comprising a first component for setting the shutter speed; a second movable component for setting the diaphragm opening; an exposure meter mounted in said camera; an indicator operable by said meter in accordance with the light value measured thereby; normally latched scanning means operable, when released, to scan the position of said indicator, and biased to move in a scanning direction; manual operating means effective to adjust the position of said indicator relative to said scanning means; an adjustable mechanical coupling mechanism operatively associated with both of said components, said scanning means, said manual operating means, and said indicator; said coupling mechanism being selectively operable, in one position, to mechanically couple said first component to said scanning means and said second component to said manual operating means, in a second position to mechanically couple said second component to said scanning means and said first component to said manual operating means, and in a third position to mechanically uncouple both of said components from said scanning means and from said manual operating means, and to operatively disassociate said indicator from said scanning means, for independent manual operation of said components; whereby, in said one position of said mechanical coupling mechanism, the shutter speed is selected manually and the diaphragm opening is set in accordance with the selected shutter speed and the reading of said meter, in the second position of said mechanical coupling mechanism, the diaphragm opening is set manually and the shutter speed is set in accordance with the selected diaphragm opening and the reading of said meter, and in said third position of said mechanical coupling means, the shutter speed and the diaphragm opening are manually settable independently of each other and of the reading of said meter.

2. In a photographic camera, the combination comprising a first movable component for setting the shutter speed; a second movable component for setting the diaphragm opening; an exposure meter, including an indicating mechanism adjustably positioned in said camera; an indicator operable by said mechanism in accordance with the light value measured by said meter, and bodily movable with said mechanism; first and second component adjusting elements movably mounted adjacent said first and second components for selective conjoint movement with the latter; means for manually moving said first element; interengageable cam and follower means on said first element and said indicating mechanism effective, during movement of said first element, to adjust the position of said mechanism relative to said second element; stepped surface means on said second element cooperable with said indicator; means biasing said second element to move in a direction to engage a selected portion of said stepped surface means with said indicator in accordance with the indicating position of the latter; means releasably latching said second element against movement by said biasing means; first interengageable latch means on, respectively, said first and second components, and said first element; second interengageable latch means on, respectively, said first and second components, and said second element; and a movable operator operatively associated with both of said latch means and effective, in one position, to operate both said latch means to couple said first component to said first element and said second component to said second element, in a second position, to operate both said latch means to couple said second component to said first element and said first component to said second element, and, in a third position, to disengage both of said latch means; whereby, in said one position, the shutter speed is manually settable and the diaphragm opening is set in accordance with the selected shutter speed and the meter indication, in said second position, the diaphragm opening is manually settable and the shutter speed is set in accordance with the selected diaphragm opening and the meter indication, and in said third position, the shutter speed and the diaphragm opening are manually settable independently of each other and of the meter indication.

3. In a photographic camera as claimed in claim 2: means coupling said operator to said indicating mechanism and effective, in the third position of said operator, to move said indicating mechanism to position said indicator out of the range of action of said stepped surface means.

4. In a photographic camera having an objective mount, the combination comprising a shutter speed setting ring rotatably mounted on said objective mount; a diaphragm opening setting ring rotatably mounted on said objective mount adjacent said shutter speed setting ring; an exposure meter, including an indicating mechanism adjustably positioned in said camera; an indicator operable by said mechanism in accordance with the light value measured by said meter, and bodily movable with said mechanism; first and second generally annular adjusting elements rotatably mounted on said objective mount adjacent said rings for selective conjoint movement with the latter; means for manually moving said first element; interengageable cam and follower means on said first element and said indicating mechanism effective, during movement of said first element, to adjust the position of said indicating mechanism relative to said second element; scanning means on said second element operable, during movement of the latter, to scan the position of said indicator; means biasing said second element to move in a scanning direction; means normally latching said second element against movement by said biasing means; adjustable mechanical coupling mechanism operatively associated with both of said rings, both of said elements, and said indicating mechanism; said mechanical coupling mechanism being operable, in one position, to mechanically couple one of said rings to said first element and the other of said rings to said second element, in a second position, to couple the other of said rings to said first element and said one of said rings to said second element, and in a third position, to uncouple both of said rings from both of said elements and to operatively disassociate said indicator from said scanning means, for independent manual operation of said rings; whereby, in said one position, one of the two values, shutter speed or diaphragm opening, is manually settable and the other of such two values is set in accordance with the manually set value and the meter indication, in the second position, the said other of such two values is manually settable and the said one of such values is set in accordance with the manually set value and the meter indication, and in the third position, both the shutter speed and the diaphragm opening are manually settable; and release means selectively operable to operate said latch means to release said second element.

5. In a photographic camera as claimed in claim 4: said interengageable cam and follower means comprising an arcuately elongated recess in said first element formed with cam surface means engageable with a follower fixed relative to said indicating mechanism; said scanning means comprising an arcuately elongated recess in said second element formed with stepped surface means selectively engageable with said indicator.

6. In a photographic camera as claimed in claim 5: said recesses being tapered from one arcuate end to the other arcuate end thereof, and being substantially symmetrical about a bisecting arc concentric with the axis of the objective mount; said stepped surface means comprising a pair of respective stepped surfaces each extending along one of the generally arcuate edges of the recess in said second element; said cam surface means comprising a pair of cam surfaces each extending along one of the generally arcuate edges of the recess in said first element.

7. In a photographic camera as claimed in claim 6: one of said stepped surfaces being coordinated with the shutter speed values and the other of said stepped surfaces being coordinated with the diaphragm opening values.

8. In a photographic camera as claimed in claim 5: a slide movably mounted in said camera, said indicating mechanism being mounted on said slide; said indicator comprising a lever pivoted intermediate its ends at substantially its center of gravity to said slide and having an end projecting into said stepped recess; the opposite end of said lever having an aperture therein; said indicating mechanism being a movable coil instrument having a pointer extending into the aperture in said lever and effective to swing the latter in accordance with the movement of said pointer.

9. In a photographic camera as claimed in claim 8: said one end of said lever having a maximum flexibility in a direction perpendicular to its plane of movement; and stop means operatively associated with said stepped recess and engageable with said one end of said lever to limit the deflection thereof upon contact of said one end by said stepped surface means.

10. In a photographic camera as claimed in claim 4: a first slide adjustably mounted in the camera, said cam follower being fixed to said first slide; a second slide adjustably mounted on said first slide, said indicating mechanism being mounted on said second slide; and film sensitivity selecting means operatively connected to said second slide and effective to adjust the position thereof relative to said first slide in accordance with the film sensitivity.

11. In a photographic camera as claimed in claim 10: said film sensitivity selecting means comprising a drum rotatably mounted on said first slide and having a scale of film sensitivity values on its periphery; a pinion fixed to the shaft of said drum; and a rack on said second slide engaged with said pinion.

12. In a photographic camera as claimed in claim 4: each of said rings being formed with an extension provided with an arcuate slot, the two slots overlapping each other; said mechanical coupling mechanism including a first latching lever pivotally mounted on said shutter speed ring, a second latching lever pivotally mounted on said diaphragm opening setting ring, a third lever pivotally mounted on said second element and carrying a pin projecting through said arcuate slots and cooperable with said latching levers, radial recesses extending from each of said slots and selectively cooperable with said pin, and a latching member carried by said first element; a movable selector engaged with said pin and selectively operable to move the latter to a first position in which said pin is engaged with the radial recess of said diaphragm opening setting ring and moves said first latching lever to engage the latching member of said first element, a second position in which said pin is engaged with the radial notch of said shutter speed setting ring and moves said second latching lever to engage the latching member of said first element, and a third position in which said pin is freely movable through both of said slots and both of said latching levers are disengaged from the latching member of said first element.

13. In a photographic camera as claimed in claim 12: said selector comprising a slide formed with a fork receiving said pin; and an operator mechanically coupled to said slide and to said indicating mechanism and effective to adjust the latter in accordance with the adjusted position of said selector slide.

14. In a photographic camera as claimed in claim 13: the means coupling said operator to said indicating mechanism including a lever pivoted intermediate its ends and having one end engaging a pin fixed to said indicating mechanism and the other end engaging a pin fixed to said operator; and a toggle spring connected to said lever and to a fixed point of the camera and toggling said lever to either one of two limiting positions.

15. In a photographic camera as claimed in claim 13: a manual operator for said first element; a pointer extending from said first element; shutter speed scale means and diaphragm aperture scale means cooperable with said pointer; said operator comprising a drum rotatably mounted for movement between each of said three positions; a pin on said drum engaged in a slot in said slide; latch means operable to lock said drum in each of said positions; and release means on said rings cooperable with said latch means and effective to release the same only when each of said rings is in a selected limiting position.

16. In a photographic camera as claimed in claim 15: said diaphragm aperture scale means being arranged in an arc immediately adjacent said pointer; said slide having a lateral extension with an arcuate inner edge and arranged, in one position of said mechanical coupling mechanism, to cover said diaphragm aperture scale; the shutter speed scale means comprising a shutter speed scale extending along the arcuate inner edge of said extension for cooperation with said pointer in said one position of said mechanical coupling mechanism.

17. In a photographic camera as claimed in claim 13: said operator comprising a drum provided with spaced scales of diaphragm aperture values and shutter speed values on its periphery and cooperable with a fixed reference: a pin on said operator; a link having, at one end, a lost motion connection with said pin and biased to one extreme of said lost motion; a second slide slidably mounted on said first-mentioned slide and having an end connected to the other end of said link; a rack on said second slide engageable with an arcuate rack on said first element; a second pin on said drum engaged with said first slide to move the latter between said three positions; and means releasably retaining said first slide in each of said three positions; said drum acting as the manual operating means for said first element.

18. In a photographic camera as claimed in claim 4: means operatively associated with each of said rings and said mechanical coupling mechanism and effective to prevent operation of said coupling mechanism except when both of said rings occupy a preselected limiting position.

References Cited in the file of this patent

UNITED STATES PATENTS

| | | |
|---|---|---|
| 2,148,963 | Ravch | Feb. 28, 1939 |
| 2,780,971 | Fahlenberg | Feb. 12, 1957 |
| 2,913,969 | Faulhaber | Nov. 24, 1959 |
| 2,925,760 | Broschke | Feb. 23, 1960 |

FOREIGN PATENTS

| | | |
|---|---|---|
| 711,664 | Great Britain | July 7, 1954 |